United States Patent
Park, IV

(10) Patent No.: US 8,113,849 B2
(45) Date of Patent: Feb. 14, 2012

(54) DOCKING SYSTEM FOR USE WITH A MOBILE MEDICATION CART

(75) Inventor: William C. Park, IV, Charleston, SC (US)

(73) Assignee: Translogic Corporation, Denver, CO (US)

(*) Notice: Subject to any disclaimer, the term of this patent is extended or adjusted under 35 U.S.C. 154(b) by 904 days.

(21) Appl. No.: 12/145,170

(22) Filed: Jun. 24, 2008

(65) Prior Publication Data

US 2009/0319094 A1 Dec. 24, 2009

(51) Int. Cl.
*H01R 33/00* (2006.01)
(52) U.S. Cl. ............... 439/34; 439/347; 439/248
(58) Field of Classification Search .......... 439/34, 439/247, 248, 347
See application file for complete search history.

(56) References Cited

U.S. PATENT DOCUMENTS

| | | | | |
|---|---|---|---|---|
| 5,516,303 A | * | 5/1996 | Yohn et al. | 439/248 |
| 5,752,845 A | * | 5/1998 | Fu | 439/247 |
| 6,450,828 B1 | * | 9/2002 | Gordon | 439/347 |
| 7,458,837 B2 | * | 12/2008 | Mineo | 439/248 |
| 2002/0151192 A1 | * | 10/2002 | Canuto et al. | 439/34 |
| 2008/0261435 A1 | * | 10/2008 | Brinkhous et al. | 439/350 |

* cited by examiner

*Primary Examiner* — Thanh Tam Le
(74) *Attorney, Agent, or Firm* — Marsh Fischmann & Breyfogle LLP

(57) ABSTRACT

The docking system includes a wall-mounted assembly having an extending contact portion which includes a set of power contacts for supplying power to a medication cart via a docking port located on the medication cart when the cart is engaged with the wall-mounted assembly. The contact portion includes a depending hook member which engages a spring-biased locking solenoid in the docking port to lock the cart to the wall-mounted assembly when the cart is moved into contact with the wall-mounted assembly. The cart can be unlocked by a signal to the locking solenoid from the cart or manually.

9 Claims, 5 Drawing Sheets

DOCKING SYSTEM FOR USE WITH A MOBILE MEDICATION CART

TECHNICAL FIELD

This invention relates generally to mobile medication carts, and more specifically concerns a system for securing a mobile medication cart to, and releasing it from, a stationary member, such as a building wall.

BACKGROUND OF THE INVENTION

Mobile (portable) medication carts, for use in hospitals and similar care facilities, are well known. One example of such a medication cart is shown in U.S. patent application Ser. No. 11/535,348, which is owned by the assignee of the present invention. Examples of other medication carts are shown in U.S. Pat. No. D517,768 and U.S. Pat. No. 5,743,607. While each of these carts have their own advantages with respect to storage and dispensing of medications at a patient's bedside, there is a need for all such carts to be quickly and reliably securable when not in use, to be connectable to a wired network interface for remote diagnostics and maintenance, and to be able to have their on-board batteries conveniently recharged when so secured.

DISCLOSURE OF THE INVENTION

Accordingly, there is disclosed herein a docking system for a portable medication cart, comprising: a wall-mounted assembly which includes a contact portion which in turn includes a set of power contacts for supplying power to a medication cart when the cart is connected to the contact portion, the wall-mounted assembly further including a depending hook member; a docking port located on the medication cart, the docking port including receiving contacts which mate with the power contacts on the contact portion of the wall-mounted assembly to receive power from the wall-mounted assembly, and further including a spring-biased locking solenoid which mates with the depending hook member on the wall-mounted assembly to lock the cart to the wall-mounted assembly; and a system for unlocking the locking solenoid such that the cart can be moved away from the wall-mounted assembly by a user.

BEST MODE FOR CARRYING OUT THE INVENTION

Figure 1:
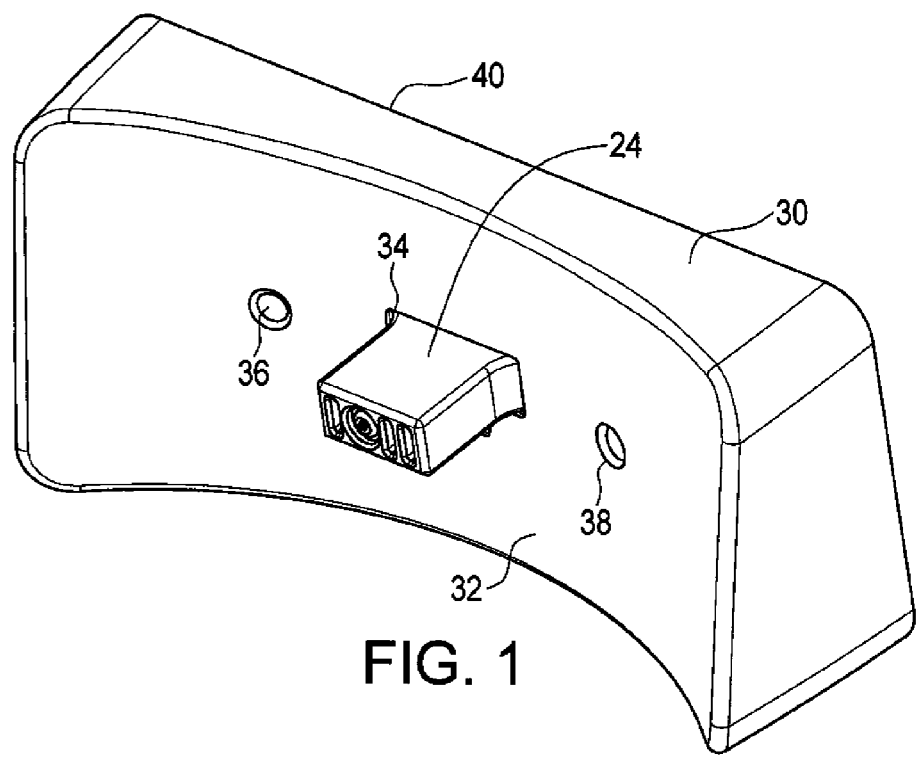
FIG. 1 is a perspective view of a wall contact assembly and cover/shroud therefor which form a portion of the docking system.
Figure 2:
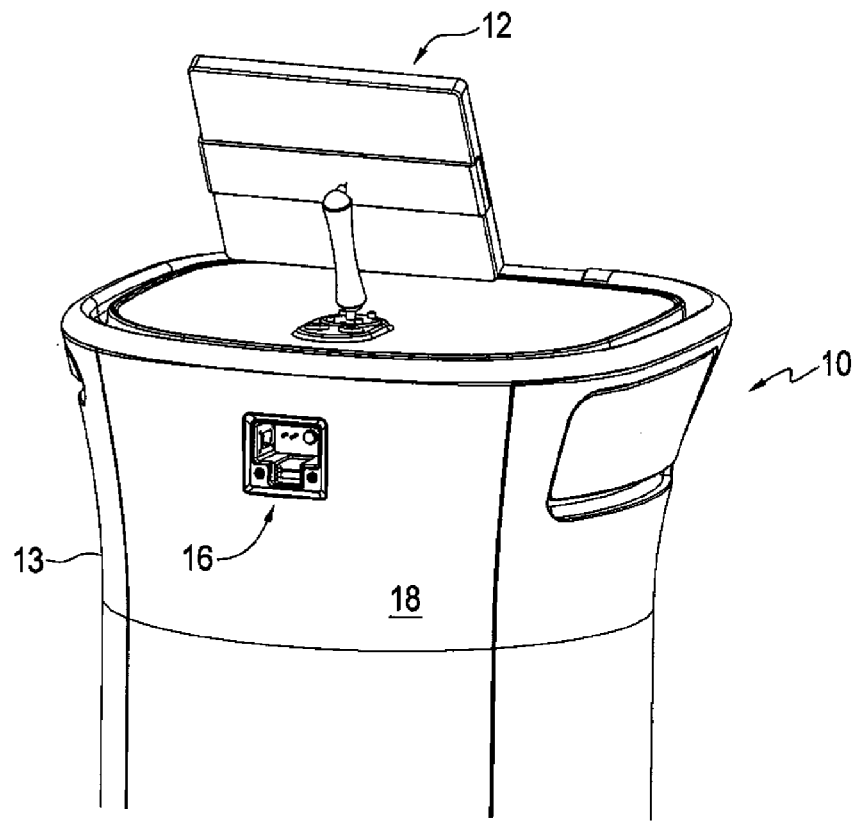
FIG. 2 is a perspective view of a portion of a medication cart, including a docking port portion of the docking system.

FIG. 2 shows the rear of a medication cart 10. Cart 10 includes an interactive user display 12 and a cabinet/body assembly 13 for storing and dispensing medications. The cart typically has wheels so that it is mobile, conveniently movable to a patient's bedside, such as in a hospital, nursing home or similar circumstance. Medication cart 10 can comprise a variety of configurations and arrangements. One such cart is shown in detail in published application Ser. No. 11/535,348, which is owned by the assignee of the present invention. The contents of that published application are hereby incorporated by reference.

Figure 6:
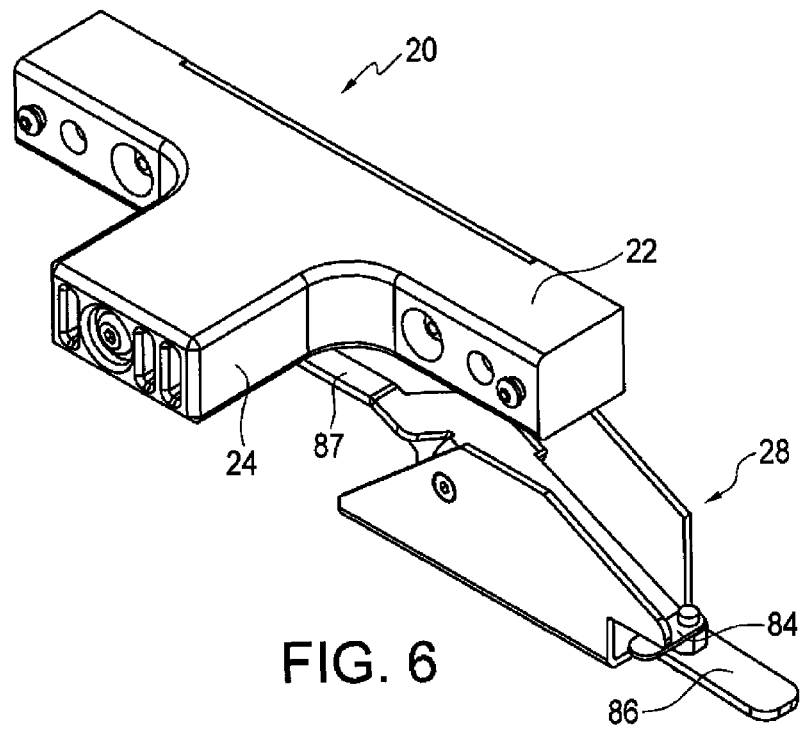
FIG. 6 is a perspective view of the wall contact assembly of FIG. 1.
Figure 7:
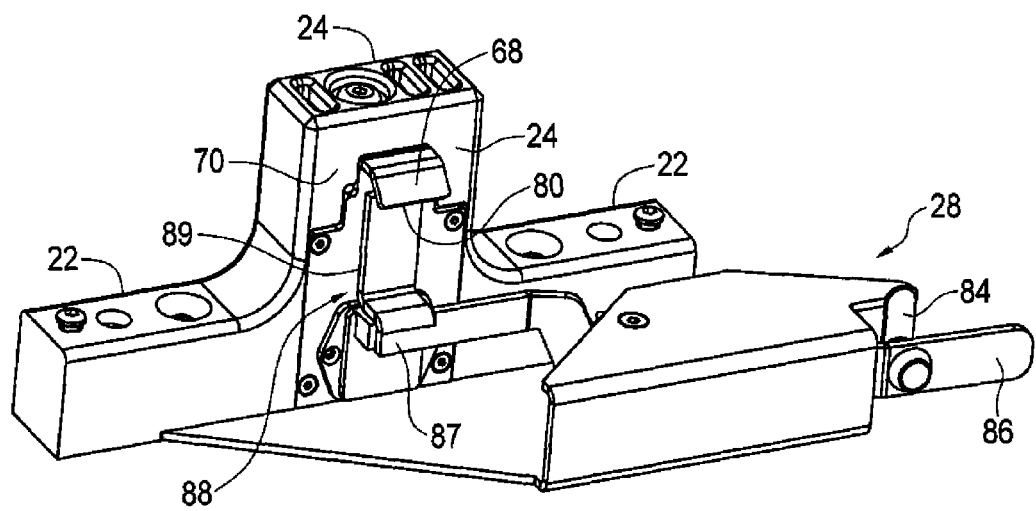
FIG. 7 is a perspective view of the wall contact assembly from the lower surface of the assembly.

A docking port 16 is located in the rear surface 18 of cart 10. Docking port 16, which is explained in more detail in following paragraphs, is arranged to receive a portion of a wall-mounted contact assembly 20 (FIGS. 1 and 6-8). The wall contact assembly 20 is generally T-shaped, comprising a base portion 22 and an extending portion 24 which comes into contact with and latches with docking port 16 on cart 10. The base portion 22 of contact assembly 20 is attachable to a structural wall by screws or other fasteners. The contact assembly 20 includes a manual release assembly shown generally at 28 (FIGS. 6-7). The contact assembly 20 is also explained in more detail in following paragraphs.

Most of contact assembly 20 is covered with a shroud 30 which has a front surface 32 which is configured to mate snugly against rear surface 18 of the cart and designed to help guide the cart into a docked position against the contact assembly. Shroud 30 has an opening 34 which allows extending portion 24 of the contact assembly to extend therethrough, and further has small spaced openings 36 and 38, permitting attachment by screws or the like of shroud 30 to base portion 22 of the contact assembly. The shroud has a rear peripheral edge 40 which is configured to mate against a structural wall.

Figure 3:
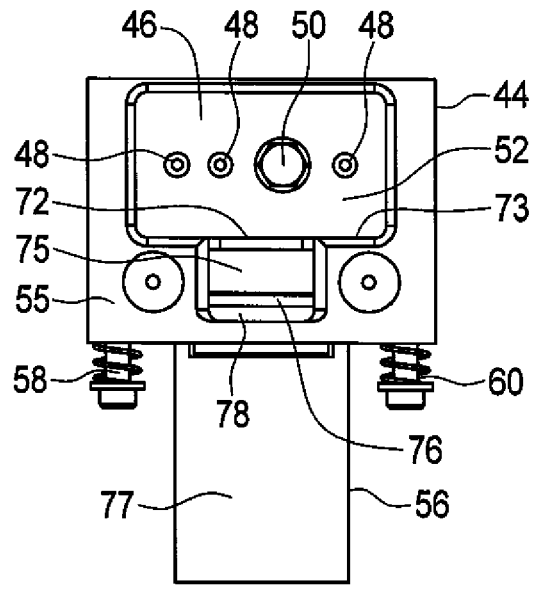
FIG. 3 is a front elevational view of the docking port of FIG. 2.
Figure 4:
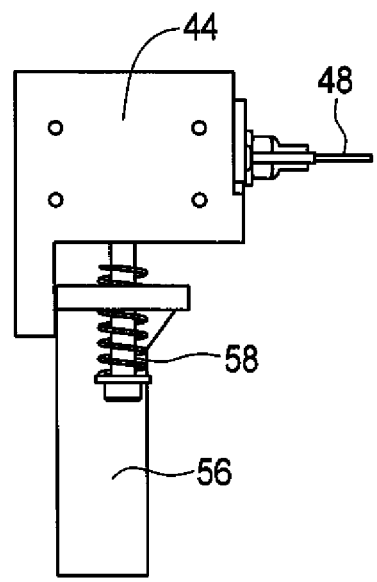
FIG. 4 is a side elevational view of the docking port of FIG. 2.
Figure 5:
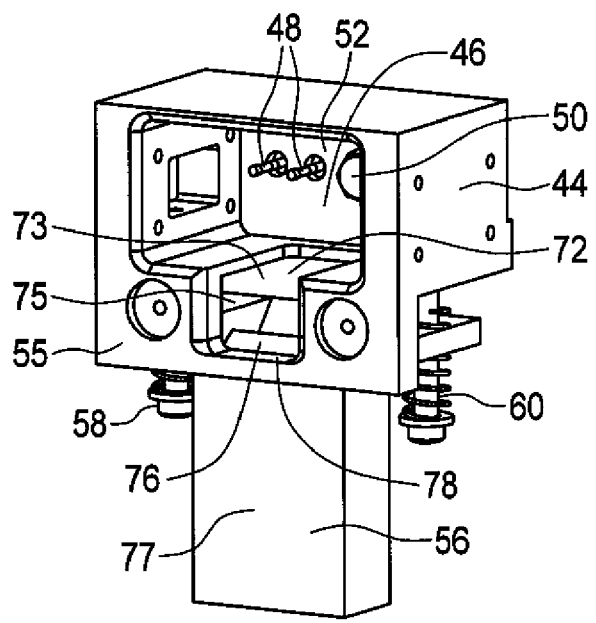
FIG. 5 is a perspective view of the docking port of FIG. 2.

FIGS. 3, 4 and 5 show docking port 16 in more detail. Docking port 16 includes a housing 44 having a cavity 46 therein with an open front area. Extending from the rear of housing 44 into cavity 46 are power pins 48-48 which are capable of receiving power, typically 115V, from an external source, such as the wall contact assembly. The power pins 48 connect to a battery recharging unit within the cart (not shown).

Extending also from the rear of housing 44 into cavity 46 is a bolt head 50, which in the embodiment shown is approximately ¼-inch across and extends a small distance (⅛-¼ inch) into the cavity from a rear surface 52 of the housing. Secured to the housing slightly to the rear of a front surface 55 thereof is a spring-action locking solenoid 56. Locking solenoid 56 is spring-mounted to housing 44 by two springs 58 and 60 and extends downwardly from the housing. When the contact assembly engages the docking port, pressure will be exerted in a downward direction, compressing springs 58 and 60. Springs 58 and 60 provide for proper vertical alignment between docking port 16 and contact assembly 20 when elevation irregularities exist between the two.

Figure 8:
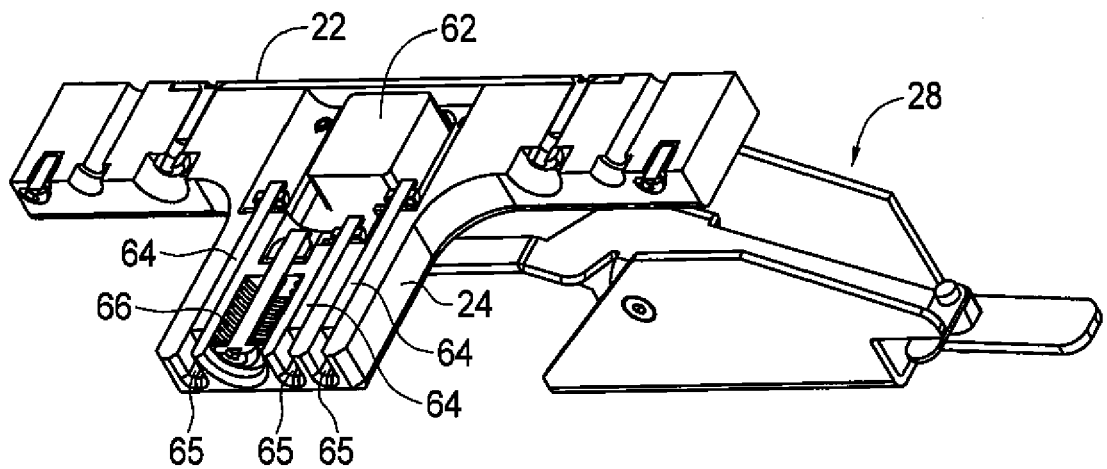
FIG. 8 is a perspective view of a partial cross-section of the wall contact assembly.
Figure 9:
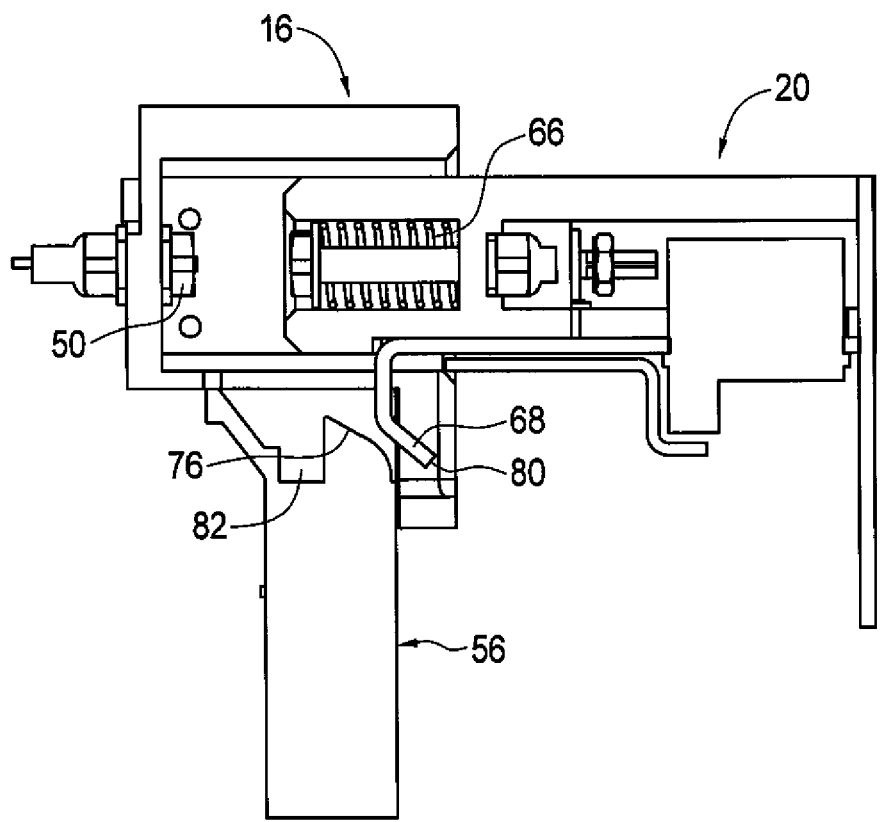
FIG. 9 is a cross-sectional view showing the wall contact assembly and the docking port portion of a medication cart partially engaged but not latched.

FIGS. 6, 7 and 8 show the wall contact assembly in detail. Extending portion 24 includes a power cord connector assembly 62 that receives conventional wall power via a power cord plugged into a wall outlet. The power cord connector assembly 62 is in turn electrically connected to power contacts 64-64 which are positioned in a side-by-side relationship in openings 65-65 to receive power pins 48 in docking port 16. Extending portion 24 also includes a spring member 66 positioned between two of the power contacts 64. When the cart is secured and latched to the wall contact assembly, the bolt head 50 in docking port 16, which is in registry with spring member 66, slightly compresses the spring member, typically within a range of ⅛-¼ inch.

Referring now to FIG. 7 in particular, an angled hook member 68 is secured to and extends downwardly from lower surface 70 of extending portion 24. Referring again to FIGS. 3 and 5, the docking port includes a cut-out portion 72 in housing 44, defining an opening in the lower surface 73 of the cavity, and further defining a lower open portion 75 of the open front of the cavity. The upper surface 76 of solenoid 56 is chamfered inwardly from a front surface 77 thereof, the upper chamfered surface 76 extending slightly above the lower edge 78 of open portion 75 of cut-out portion 72 when springs 58 and 60 are in a relaxed, non-compressed state.

When the cart is maneuvered so that extending portion 24 of the wall contact assembly 20 initially engages docking port 16, hook member 68 pushes against chamfered surface 76 of solenoid 56, forcing the solenoid down against the action of an internal spring (not shown), allowing the hook member 68 to move to the rear of the chamfered surface as the cart is moved further toward the wall contact assembly. When free edge 80 of the hook member clears chamfered surface 76 of the solenoid, the internal spring will release, pushing solenoid 56 upwardly. The hook member at this point is positioned in a groove 82 in the upper surface of the solenoid behind chamfered surface 76. This locks the cart to the wall contact assembly, i.e. the cart cannot be pulled away from the wall contact assembly. In this position, power contacts 64 from the wall contact assembly engage the power pins 48 of the docking port 16, allowing the batteries in the cart to be recharged. Further, spring member 66 in the wall contact assembly is slightly compressed by bolt head 50 in the docking port. The cart is secured to the wall contact assembly and hence to the wall, as well as connected to available power from a wall outlet. When secured, the cart can also receive diagnostic/maintenance services through a network interface on the wall contact assembly.

Figure 10:
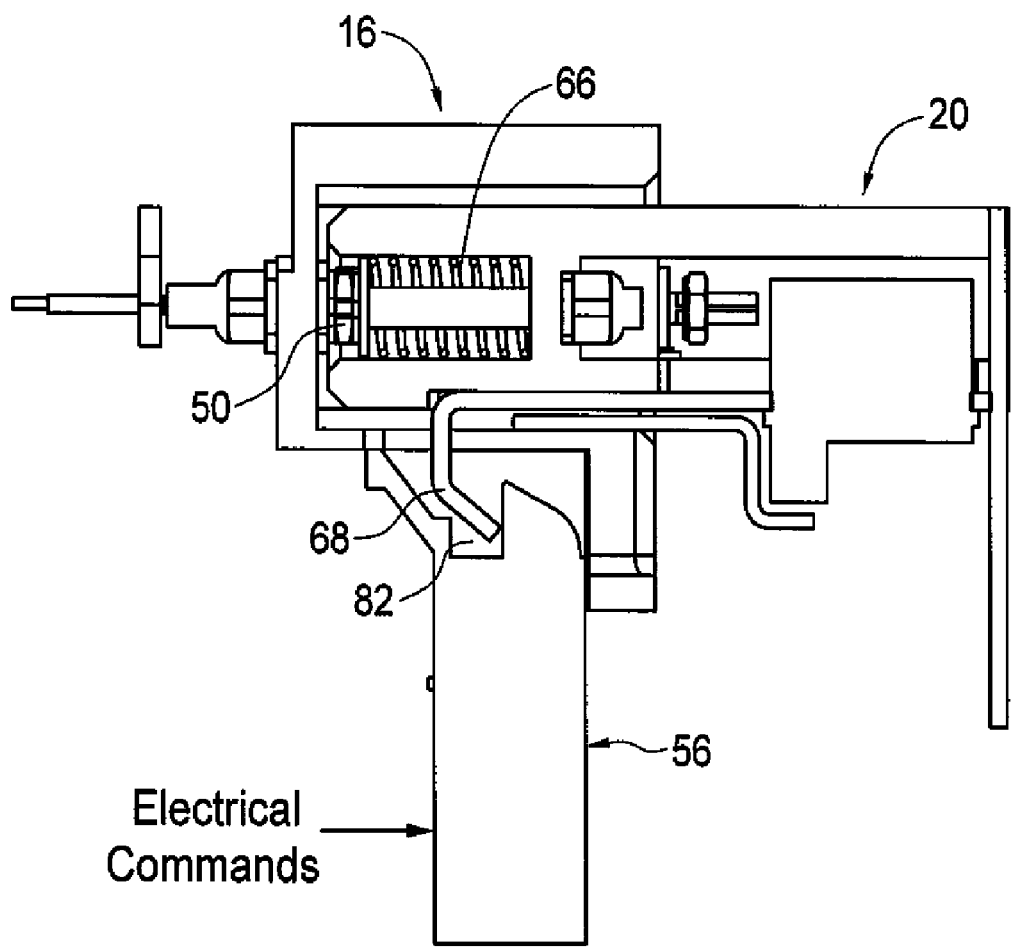
FIG. 10 is a cross-sectional view similar to that of FIG. 9, showing the wall contact assembly and the docking port engaged and latched.

The cart can be released either automatically or manually. The locking solenoid 56 can be energized via a command from the cart (FIG. 10), which results in the solenoid being moved downwardly sufficiently that the chamfered surface of the solenoid is below the hook member. When this occurs, spring member 66 will provide a slight force against the bolt head 50 sufficient to provide a feedback to the user via a small spring action against the cart that the cart has been unlocked, so that the user knows that the cart can be moved away from the wall contact assembly. The cart is now ready for use, to be moved to the bedside of a patient.

In the event that the automated unlocking system fails, a user will be able to unlock the system manually. Referring to FIGS. 6 and 7, the user will first rotate cam lock tab 84 and will then move locking lever 86 upwardly. This will result in the opposing end 87 of locking lever 86 moving downwardly, forcing actuating arm 88 downwardly, a portion of which is immediately adjacent opposing end 87 of lever 86. In its non-operative state, flat portion 89 of arm 88 is positioned immediately above the solenoid 56. When opposing end 87 of lever 86 moves downwardly, flat portion 89 of arm 88 also moves downwardly, against the top of the solenoid, forcing the solenoid downwardly sufficiently against the action of its internal spring that hook member 68 clears chamfered surface 76, permitting spring member 64 to slightly move the cart, providing a feedback indication to the user that the cart can be moved away from the wall contact assembly.

Hence, a system has been disclosed which reliably and conveniently permits the secure docking of a medication cart, as well as providing a concurrent capability of charging the batteries on the cart and for receiving diagnostic and maintenance assistance through a wired network interface.

Although a preferred embodiment of the invention has been disclosed for purposes of illustration, it should be understood that various changes, modifications and substitutions may be incorporated in the embodiment without departing from the spirit of the invention which is defined by the claims which follow.

What is claimed is:

1. A docking system for a portable medication cart, comprising:
    a wall-mounted assembly which includes a contact portion which in turn includes a set of power contacts for supplying power to a medication cart when the cart is connected to the contact portion, wherein the contact portion includes a base section which is attachable to a wall, and an extending section in which is positioned the power contacts and wherein the wall-mounted assembly includes a shroud which covers the base section, the shroud being configured to mate with a portion of an exterior surface of the medication cart, the wall-mounted assembly further including a depending hook member;
    a docking port located on the medication cart, the docking port including receiving contacts which mate with the power contacts on the contact portion of the wall-mounted assembly to receive power from the wall-mounted assembly, and further including a spring-biased locking solenoid which mates with the depending hook member on the wall-mounted assembly to lock the cart to the wall-mounted assembly; and
    a system for unlocking the locking solenoid such that the cart can be moved away from the wall-mounted assembly by a user.

2. The docking system of claim 1, including a spring member in the contact portion of the wall-mounted assembly and an extended member in the docking port in registry with the spring member, arranged so that when the docking port engages the contact portion, the spring member is slightly compressed by the extended member.

3. The docking system of claim 2, wherein the extended member is a bolt head.

4. The docking system of claim 1, wherein the system for unlocking the locking solenoid includes a signal system in the medication cart for producing a signal and transmitting the signal to the solenoid.

5. The docking system of claim 1, wherein the system for unlocking the locking solenoid is a manual mechanical system, operated by the user.

6. The docking system of claim 5, wherein the manual system includes a lever assembly operable by a user for pressing the solenoid downwardly, compressing a solenoid spring sufficiently that the depending hook member comes away from mating contact with the solenoid, permitting the cart to be moved away from the wall mounting assembly.

7. The docking system of claim 1, wherein the depending hook member angles inwardly toward a rear surface of the wall-mounted assembly, and wherein the solenoid has a chamfered top edge and a slot to the rear thereof in an upper surface of the solenoid so that as the cart is moved into engagement with the wall-mounted assembly, the hook member first contacts the chamfered top edge of the solenoid, forcing the solenoid downwardly, compressing the solenoid spring, and wherein further movement of the cart results in the hook member moving to the rear of the top chamfered edge and into engagement with the slot to the rear of the solenoid, thereby locking the cart to the wall contact assembly.

8. A docking system for a portable medication cart, comprising:
- a wall-mounted assembly which includes a contact portion which in turn includes a set of power contacts for supplying power to a medication cart when the cart is connected to the contact portion, the wall-mounted assembly further including a depending hook member;
- a docking port located on the medication cart, the docking port including receiving contacts which mate with the power contacts on the contact portion of the wall-mounted assembly to receive power from the wall-mounted assembly, and further including a spring-biased locking solenoid which mates with the depending hook member on the wall-mounted assembly to lock the cart to the wall-mounted assembly; and
- a manual mechanical system, operated by the user, for unlocking the locking solenoid such that the cart can be moved away from the wall-mounted assembly by a user, wherein the manual system includes a lever assembly operable by a user for pressing the solenoid downwardly, compressing a solenoid spring sufficiently that the depending hook member comes away from mating contact with the solenoid, permitting the cart to be moved away from the wall mounting assembly.

9. A docking system for a portable medication cart, comprising:
- a wall-mounted assembly which includes a contact portion which in turn includes a set of power contacts for supplying power to a medication cart when the cart is connected to the contact portion, the wall-mounted assembly further including a depending hook member, wherein the depending hook member angles inwardly toward a rear surface of the wall-mounted assembly;
- a docking port located on the medication cart, the docking port including receiving contacts which mate with the power contacts on the contact portion of the wall-mounted assembly to receive power from the wall-mounted assembly, and further including a spring-biased locking solenoid which mates with the depending hook member on the wall-mounted assembly, wherein the solenoid has a chamfered top edge and a slot to the rear thereof in an upper surface of the solenoid so that as the cart is moved into engagement with the wall-mounted assembly, the hook member first contacts the chamfered top edge of the solenoid, forcing the solenoid downwardly, compressing the solenoid spring, and wherein further movement of the cart results in the hook member moving to the rear of the top chamfered edge and into engagement with the slot to the rear of the solenoid, thereby locking the cart to the wall contact assembly; and
- a system for unlocking the locking solenoid such that the cart can be moved away from the wall-mounted assembly by a user.

* * * * *